(12) United States Patent
Yamada

(10) Patent No.: US 12,485,442 B2
(45) Date of Patent: Dec. 2, 2025

(54) COVERED CONTAINER FOR LIQUID COSMETIC

(71) Applicant: KOSE CORPORATION, Tokyo (JP)

(72) Inventor: Koji Yamada, Tokyo (JP)

(73) Assignee: KOSE CORPORATION, Tokyo (JP)

( * ) Notice: Subject to any disclaimer, the term of this patent is extended or adjusted under 35 U.S.C. 154(b) by 112 days.

(21) Appl. No.: 18/694,843

(22) PCT Filed: May 31, 2022

(86) PCT No.: PCT/JP2022/022193
§ 371 (c)(1),
(2) Date: Mar. 22, 2024

(87) PCT Pub. No.: WO2023/067843
PCT Pub. Date: Apr. 27, 2023

(65) Prior Publication Data
US 2024/0285056 A1 Aug. 29, 2024

(30) Foreign Application Priority Data
Oct. 18, 2021 (JP) .................................. 2021170566

(51) Int. Cl.
*B05B 11/10* (2023.01)
*A45D 34/00* (2006.01)
(Continued)

(52) U.S. Cl.
CPC .......... *B05B 11/1001* (2023.01); *B05B 11/00* (2013.01); *A45D 2034/002* (2013.01); *B05B 11/10* (2023.01); *B65D 41/06* (2013.01)

(58) Field of Classification Search
CPC .............. A45D 2200/055; A45D 34/04; A45D 2034/002; B05B 11/1001; B05B 11/00;
(Continued)

(56) References Cited

U.S. PATENT DOCUMENTS

| | | | | |
|---|---|---|---|---|
| 2,193,226 A | * | 3/1940 | Deletzke | B65D 1/0253 215/324 |
| 3,904,063 A | * | 9/1975 | Hauser | B65D 41/17 215/318 |
| 4,858,777 A | * | 8/1989 | Morel | B65D 41/0471 215/331 |

FOREIGN PATENT DOCUMENTS

| | | |
|---|---|---|
| JP | S5425252 Y2 | 8/1979 |
| JP | H0676102 U | 10/1994 |
| JP | 2017105533 A | 6/2017 |

OTHER PUBLICATIONS

International Search Report in Application No. PCT/JP2022/022193, mailed Jul. 26, 2022, including English translation thereof, 5 pages.

(Continued)

*Primary Examiner* — David J Walczak
(74) *Attorney, Agent, or Firm* — Meunier Carlin & Curfman LLC

(57) ABSTRACT

A lotion container has a lid such that a lid member reliably fits on a pump body and is held thereon when the lid is closed. The lid member is easily opened by lifting the lid relative to a container body during a lid opening operation, and the pump body and the lid member are prevented from rotating together even when the lid member is rotated relative to the container body. The pump body is provided with a cylindrical outer side wall surface having a spherical engaging protrusion configured to engage the lid member. The lid member is provided, at a cylindrical inner side wall surface, with a line of circumferential rib configured to intermittently extend along an inner circumference of the lid member and to engage with the engaging protrusion of the pump body and a generatrix direction rib provided with a raising part.

5 Claims, 11 Drawing Sheets

(51) Int. Cl.
  *B05B 11/00*  (2023.01)
  *B65D 41/06*  (2006.01)
(58) Field of Classification Search
  CPC ..... B05B 11/10; B05B 11/0032; B65D 41/06;
              B65D 41/065; B65D 41/22
  USPC ..... 222/386; 401/188 R, 202, 213, 243, 262,
              401/269; 215/295, 296, 317, 321, 322,
              215/335
  See application file for complete search history.

(56)           References Cited

OTHER PUBLICATIONS

Written Opinion in Application No. PCT/JP2022/022193, mailed Jul. 26, 2022, including machine translation thereof, 8 pages.

* cited by examiner

COVERED CONTAINER FOR LIQUID COSMETIC

TECHNICAL FIELD

The present invention relates to a lotion container, and particularly to a lotion container with a lid, and particularly to a lotion container with a lid which can be opened by lifting and/or rotating a lid member relative to a container body during a lid opening operation.

BACKGROUND ART

Conventionally, as a container with a lid which carries out discharge using a pump, there are two types of configurations: a configuration comprising a container body configured to contain a content, a discharger configured to come to threaded engagement with an opening part of this container body and discharge the content, and a cap configured to detachably fit on the container body to protect this discharger; and a configuration comprising a container body configured to contain a content, a discharger configured to come to threaded engagement with an opening part of this container body and discharge the content, and a pump cap configured to detachably fit on this discharger, and in this case, there is commonly employed a container with a lid of the latter in which the appearance of a cap varies less during cap detachment and attachment than a cap with a lid of the former and the container body does not require a fitting structure relative to the cap, which makes the appearance more attractive.

PRIOR ART DOCUMENT

Patent Literature

Patent Literature 1: JP2017-105533A (particularly, see FIG. 9 and FIG. 25)

SUMMARY OF INVENTION

Technical Problem

However, such a container with a lid using a pump cap configured to detachably fit on a discharger has a problem that the pump cap is configured to detachably fit on the discharger so that usually, a lid is opened by lifting the pump cap upward relative to the container body during a lid opening operation, whereas, while the pump cap is lifted upward while being rotated, the discharger rotates together with the pump cap, which consequently loosens threaded engagement between the discharger and the container body and results in unintentional leakage of a content from the container body.

In addition, there is also a troublesome problem in a lid opening operation that it is necessary for the pump cap to be nontransparent to enhance a light shielding property for avoiding deterioration of a lotion, but such a nontransparent pump camp makes it impossible to check a fitting state from the exterior so that it is impossible for a user to determine whether the pump cap should be lifted upward or rotated to open a lid, which causes the above problem to occur more frequently.

Thus, the present invention is to solve the problem of conventional technologies as described above, and it is therefore an object of the present invention to provide a lotion container with a lid such that a lid member reliably fits on a pump body and is held thereon when the lid is closed, while the lid member is easily opened by merely being lifted relative to a container body during a lid opening operation, and furthermore, the pump body and the lid member are prevented from rotating together even when the lid member is rotated relative to the container body, the lid is easily opened without leakage of a lotion in the container body, and unintentional leakage of a content when opening the lid is prevented.

Solution to Problem

The invention according to claim 1 of the present application is to solve the above problem by a lotion container with a lid, comprising: a container body configured to contain a lotion; a pump body configured to come to threaded engagement with an upper end opening part of the container body and discharge the lotion in the container body; and a nontransparent lid member configured to detachably fit on the pump body, in which the pump body is provided with a cylindrical outer side wall surface having a spherical engaging protrusion configured to engage the lid member, and the lid member is provided, at a cylindrical inner side wall surface, with a line of circumferential rib configured to intermittently extend along an inner circumference of the lid member and to be engaged with the engaging protrusion of the pump body and a generatrix direction rib provided with a raising part configured to suspend downward than a ridge line of the circumferential rib at an intermittent gap region of the line of circumferential rib, the generatrix direction rib being configured to be engaged with the engaging protrusion of the pump body.

The invention according to claim 2 of the present application is to further solve the above problem by, in addition to the configuration of the invention according to claim 1, a feature in which the raising part of the generatrix direction rib includes a pair of guide side parts comprising a first radius of curvature and having a substantially inverted V-shape and a lower end side part comprising a second radius of curvature smaller than the first radius of curvature and connecting the pair of guide side parts.

The invention according to claim 3 of the present application is to further solve the above problem by, in addition to the configuration of the invention according to claim 1 or claim 2, a feature in which the lid member is made of a material which elastically deforms.

The invention according to claim 4 of the present application is to further solve the above problem by, in addition to the configuration of the invention according to claim 3, a feature in which a generatrix direction rib protrusion height oriented inward from the lid member is configured to be greater than a circumferential rib protrusion height oriented inward from the lid member.

The invention according to claim 5 of the present application is to further solve the above problem by, in addition to the configuration of the invention according to claim 3 or claim 4, a feature in which the generatrix direction rib of the lid member extends over more than or equal to a half height of the lid member in a detachment/attachment direction.

Effects of Invention

A lotion container with a lid according to the present invention includes: a container body configured to contain a lotion; a pump body configured to come to threaded engagement with an upper end opening part of the container body and discharge the lotion in the container body; and a nontransparent lid member configured to detachably fit on the pump body, thereby allowing the pump body and the lid member to come to an opened lid state or a closed lid state, and furthermore, the following configurations particular to the invention of the present application can produce effects particular to the invention of the present application.

According to the lotion container with a lid according to claim 1 of the present invention, the pump body is provided with the cylindrical outer side wall surface having the engaging protrusion configured to engage the lid member, and the lid member is provided, at the cylindrical inner side wall surface, with a line of circumferential rib along the inner circumference of this lid member so that, to close the pump body by the lid member, the cylindrical inner side wall surface of the lid member fits on the cylindrical outer side wall surface of the pump body, whereby the engaging protrusion of the pump body comes to engagement at at least any of abutting points of the circumferential rib along the inner circumference of the lid member and is thus prevented from detaching, while, to lift the lid member relative to the container body to release the pump body from the lid member, the circumferential rib of the lid member rides over the spherical engaging protrusion toward a lifting direction of the lid member so as to release engagement between the circumferential rib of the lid member and the engaging protrusion of the pump body, and thus, the lid member can reliably fit on the pump body and be held thereon when the lid is closed, and furthermore, the lid member can be easily opened from the pump body by merely being lifted without being rotated relative to the container body during a lid opening operation.

Moreover, according to the lotion container with a lid according to claim 1 of the present invention, the pump body is provided with the spherical engaging protrusion configured to engage the lid member, and the lid member is provided with a line of circumferential rib configured to intermittently extend along the inner circumference of this lid member and to be engaged with the engaging protrusion of the pump body and the generatrix direction rib at an intermittent gap region of this line of circumferential rib, the generatrix direction rib being configured to be engaged with the engaging protrusion of the pump body so that, to open the pump body and the lid member by rotating the lid member relative to the container body, the lid member is guided in a direction to rise up from the pump body while the raising part of the lid member abuts the engaging protrusion of the pump body so as to release engagement between the circumferential rib of the lid member and the engaging protrusion of the pump body at the intermittent gap region of the circumferential rib, which allows the lid to be easily opened while the pump body does not rotate together with the lid member even when the lid member is rotated relative to the container body during a lid opening operation, and leakage of a lotion in the container body when opening the lid can be prevented.

Further, according to the lotion container with a lid according to claim 1 of the present invention, the generatrix direction rib of the lid member is configured to suspend downward than the circumferential rib ridge line of the lid member so that, when the lid member is guided in a direction to rise up relative to the pump body, the circumferential rib of the lid member is guided upward than the engaging protrusion of the pump body, which can prevent from returning to a closed lid state caused by overrotation of the lid member and the resulting engagement again between the circumferential rib of the lid member and the engaging protrusion of the pump body even when the lid member is rotated with a great force.

In addition, according to the lotion container with a lid according to claim 1 of the present invention, the generatrix direction rib of the lid member is provided with the raising part configured to suspend downward than the circumferential rib ridge line of the lid member at an intermittent gap region of a line of circumferential rib so that, to fit the lid member on the pump body to come to a closed lid state, even when the generatrix direction rib of the lid member is pushed from directly above the engaging protrusion of the pump body, then the lid member is guided in such a manner as to rotate and escape horizontally along the raising part of the generatrix direction rib which abuts the engaging protrusion of the pump body, which allows a closed lid state to be easily realized independent of an orientation of the lid member by merely fitting the lid member on the pump body and pushing the same downward.

Furthermore, according to the lotion container with a lid according to claim 1 of the present invention, the engaging protrusion of the pump body is formed to have a spherical shape, which allows for engagement with the generatrix direction rib of the lid member in a point contact manner and accordingly less friction, whereby opening and closing by means of a detachment/attachment operation of the lid member can be carried out using a small force, and further, an operation of rotating the lid member to realize an opened lid state can be carried out using a small force.

Moreover, according to the lotion container with a lid according to claim 1 of the present invention, the pump body is provided, at the cylindrical outer side wall surface, with the spherical engaging protrusion configured to engage the circumferential rib of the lid member when the lid is closed so that the cylindrical outer side wall surface has a simple and smooth shape consisting only of a cylindrical shape and a spherical protruding shape, which allows a lotion adhering to the pump body to be easily wiped off.

According to the lotion container with a lid according to claim 2 of the present invention, in addition to the effects produced by the invention according to claim 1, the raising part of the generatrix direction rib includes the pair of guide side parts 135*e* comprising the first radius of curvature and having the substantially inverted V-shape and the lower end side part comprising the second radius of curvature smaller than the first radius of curvature and connecting this pair of guide side parts so that in comparison to a case in which the raising part is configured to have a simple semi-circular shape, the radius of curvature of the guide side part is larger and a difference in elevation of the raising part is greater due to a shaper inclination, while when in a closed lid state the lid member is rotated such that the generatrix direction rib of the lid member abuts the engaging protrusion of the pump body, and is further rotated, the lid member is reliably guided in a direction to rise up along the raising part of the generatrix direction rib, and thus in a closed lid state, by merely rotating the lid member, the lid can be reliably opened without applying a force to lift the lid member and further, returning to a closed lid state again caused by overrotation can be reliably prevented.

Furthermore, in comparison to a case in which the pair of guide side parts and the lower end side part are formed to have the same radius of curvature in such a manner as to have a semi-circular shape, the radius of curvature of the lower end side part is smaller, and to fit the lid member on the pump body to come to a closed lid state, even when the generatrix direction rib of the lid member is pushed from directly above the engaging protrusion of the pump body, then the lid member is naturally guided in such a manner as to rotate horizontally and escape along the downward convex shape of the generatrix direction rib, which allows a closed lid state to be naturally realized independent of an orientation of the lid member by merely fitting the lid member on the pump body and pushing the same downward.

According to the lotion container with a lid according to claim 3 of the present invention, in addition to the effects produced by the invention according to claim 1 or claim 2, the lid member is made of a material which elastically deforms so that a shape of the lid member in a closed lid state deforms when the lid member is guided in a direction to rise up along the downward convex shape of the generatrix direction rib 135, and restores an original shape in an opened lid state, whereby an operation of opening and closing the lid member can be smoothly carried out, and further, no wear or deformation of the circumferential rib of the lid member occurs even when repeated operations of opening and closing the lid member are carried out and the lid member in a closed lid state can be prevented from loosening.

According to the lotion container with a lid according to claim 4 of the present invention, in addition to the effects produced by the invention according to claim 3, the generatrix direction rib protrusion height oriented inward from the lid member is configured to be greater than the circumferential rib protrusion height t oriented inward from the lid member so that when in a closed lid state the lid member is rotated such that the generatrix direction rib of the lid member abuts the engaging protrusion of the pump body, and is further rotated so as to guide the lid member in a direction to rise up along the downward convex shape of the generatrix direction rib, abutment of the generatrix direction rib relative to the engaging protrusion is maintained even when the lid member is elastically deformed, and accordingly, also when the lid member is elastically deformed, the lid member can be further reliably guided in a direction to rise up with the raising part of the generatrix direction rib along the engaging protrusion of the pump body.

Furthermore, to fit the lid member on the pump body to come to a closed lid state, even when the generatrix direction rib of the lid member is pushed from directly above the engaging protrusion of the pump body and the lid member is elastically deformed, then abutment of the generatrix direction rib relative to the engaging protrusion is maintained and the lid member is reliably guided in such a manner as to escape horizontally along the raising part of the generatrix direction rib, which allows a closed lid state to be further reliably realized independent of an orientation of the lid member by merely fitting the lid member on the pump body and pushing the same downward.

According to the lotion container with a lid according to claim 5 of the present invention, in addition to the effects produced by the invention according to claim 3 or claim 4, the generatrix direction rib of the lid member extends over more than or equal to a half height of the lid member in a detachment/attachment direction so that a force applied from the engaging protrusion of the pump body is dispersed over a height direction of the generatrix direction rib and thus partial deformation of the lid member is restrained, whereby the lid member exhibits an excellent shape maintaining property and consequently, the lid member in a closed lid state can be prevented from loosening.

DESCRIPTION OF EMBODIMENTS

Figure 1:
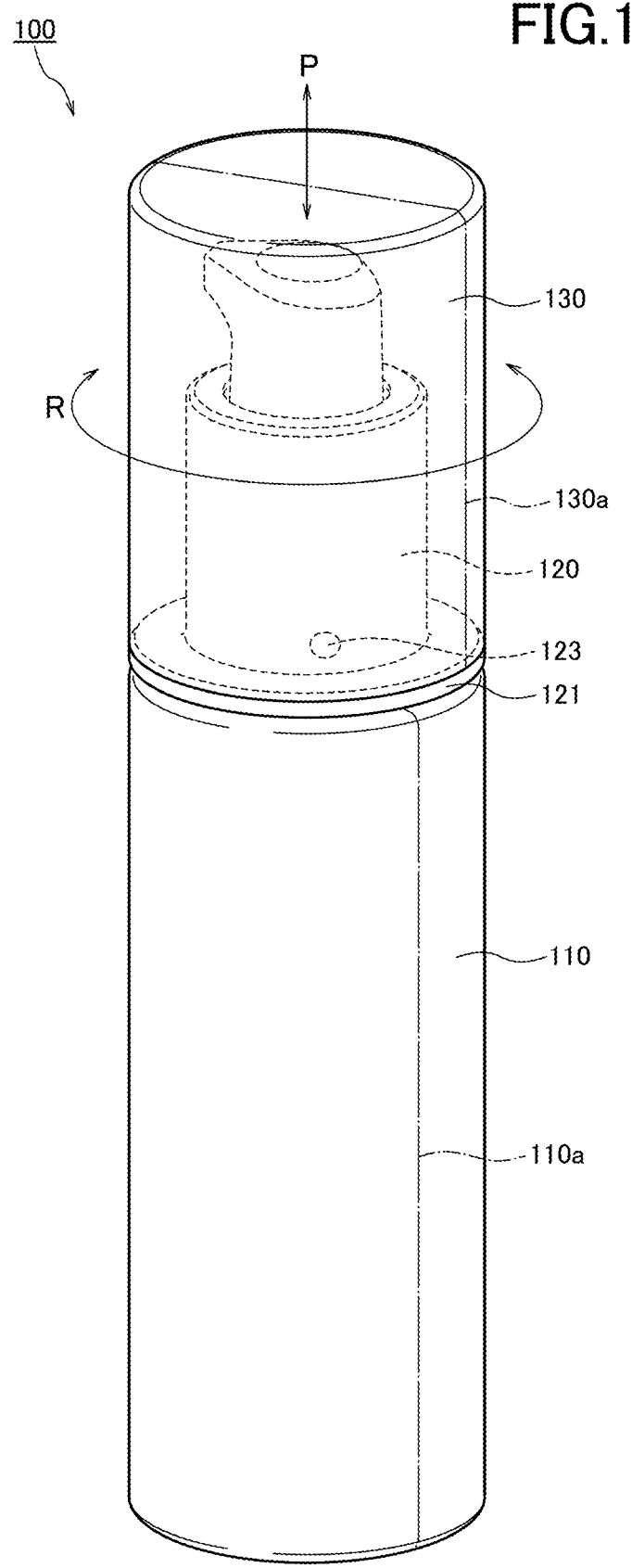
FIG. 1 is a schematic view illustrating operation directions to open a lid member of a lotion container with a lid according to the present invention.

Any specific embodiment of the present embodiment may be suitable as long as a lotion container with a lid, comprising: a container body configured to contain a lotion; a pump body configured to come to threaded engagement with an upper end opening part of the container body and discharge the lotion in the container body; and a nontransparent lid member configured to detachably fit on the pump body, characterized in that the pump body is provided with a cylindrical outer side wall surface having a spherical engaging protrusion configured to engage the lid member, and the lid member is provided, at a cylindrical inner side wall surface, with a line of circumferential rib configured to intermittently extend along an inner circumference of the lid member and to be engaged with the engaging protrusion of the pump body and a generatrix direction rib provided with a raising part configured to suspend downward than a ridge line of the circumferential rib at an intermittent gap region of the line of circumferential rib, the generatrix direction rib being configured to be engaged with the engaging protrusion of the pump body such that a lid member reliably fits on a pump body and is held thereon when the lid is closed, while the lid member is easily opened by merely being lifted relative to a container body during a lid opening operation, and furthermore, the pump body and the lid member are prevented from rotating together even when the lid member is rotated relative to the container body, the lid is easily opened without leakage of a lotion in the container body, and unintentional leakage of a content when opening the lid is prevented.

In other words, a lower end side part of the generatrix direction rib provided to the lid member of the present invention is preferably configured to be arranged below an upper end line of the circumferential rib, so that, in a closed lid state, by merely rotating the lid member, the lid can be opened without applying a force to lift the lid member, while preventing the pump body from rotating together with the lid member to loosen.

In addition, the engaging protrusion provided to the pump body of the present invention is preferably made of a material harder than a material of the lid member, and more preferably made of a hard material, such as a metal material, so that no wear occurs even when repeated operations of opening and closing the lid member are carried out.

Further, the engaging protrusion of the cylindrical outer side wall surface of the pump body of the present invention is preferably provided at three positions which are 120-degree symmetric with respect to the center so that the lid member and the pump body can be coaxially rotated using a three-point support, but, for example, may be provided at four positions which are 90-degree symmetric with respect to the center, and may be provided at five or more positions in a similar manner. In this case, it is preferable that also for the circumferential rib of the inner wall of the lid member, the configuration of portions at which the protrusion is not provided such that the circumferential rib terminates at a circumferential rib side end part corresponds to the arrangement and number of engaging protrusions, and further, it is preferable that the generatrix direction rib is arranged at positions corresponding to these portions.

Note that the "lotion" herein means a liquid cosmetic product or beauty product.

Embodiments

Hereinafter, a lotion container with a lid 100 according to an embodiment of the present invention will be explained with reference to FIG. 1 to FIG. 7D.

Figure 2A:
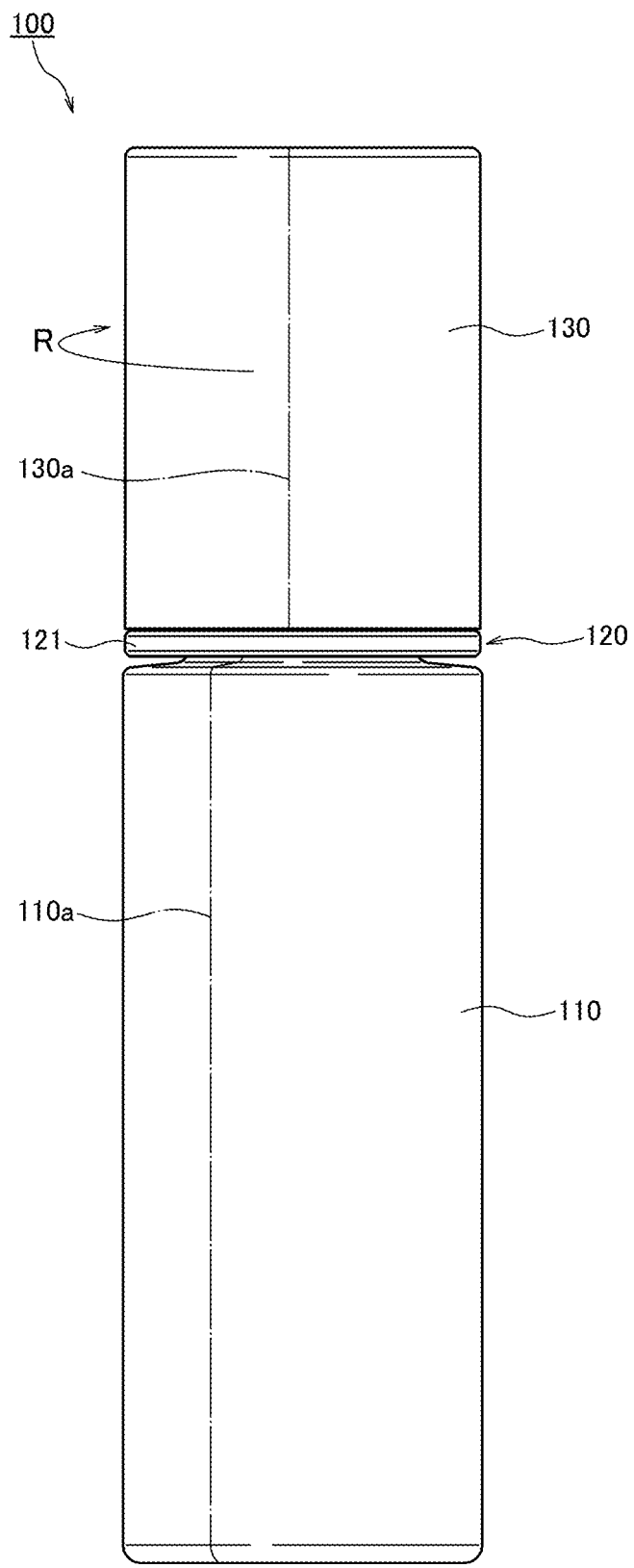
FIG. 2A is a schematic front view illustrating a closed lid state of the lotion container with a lid according to the present invention.
Figure 2B:
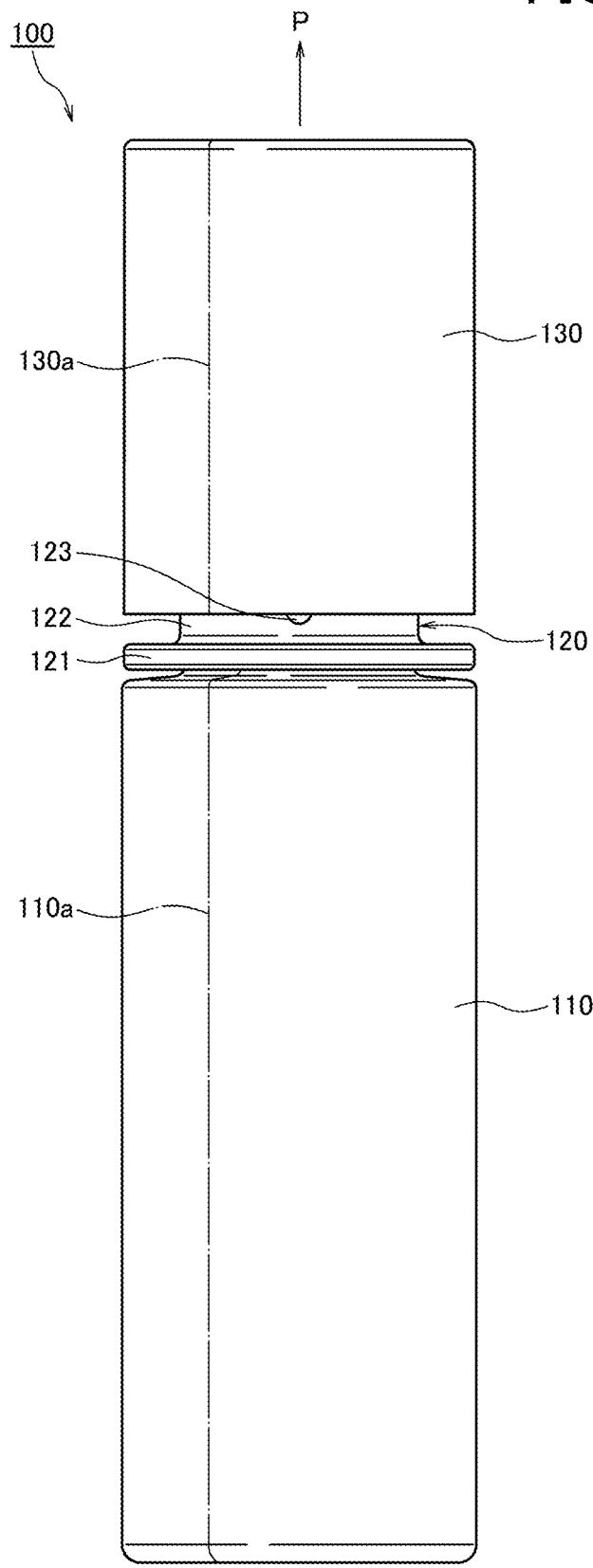
FIG. 2B is a schematic front view illustrating an opened lid state of the lotion container with a lid by means of a rotational operation according to the present invention.
Figure 3:
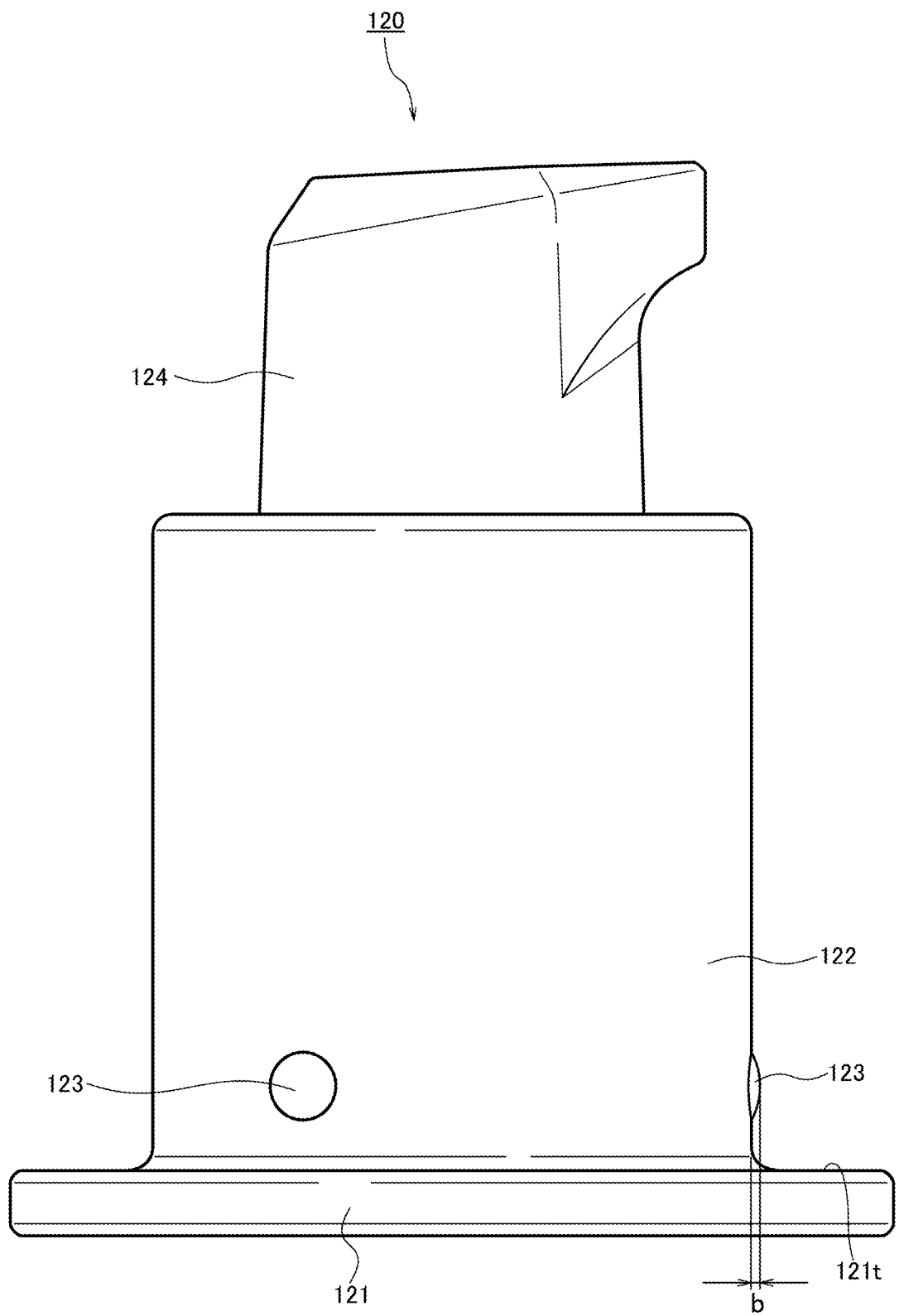
FIG. 3 is a schematic view illustrating a pump body according to the present invention.
Figure 4:
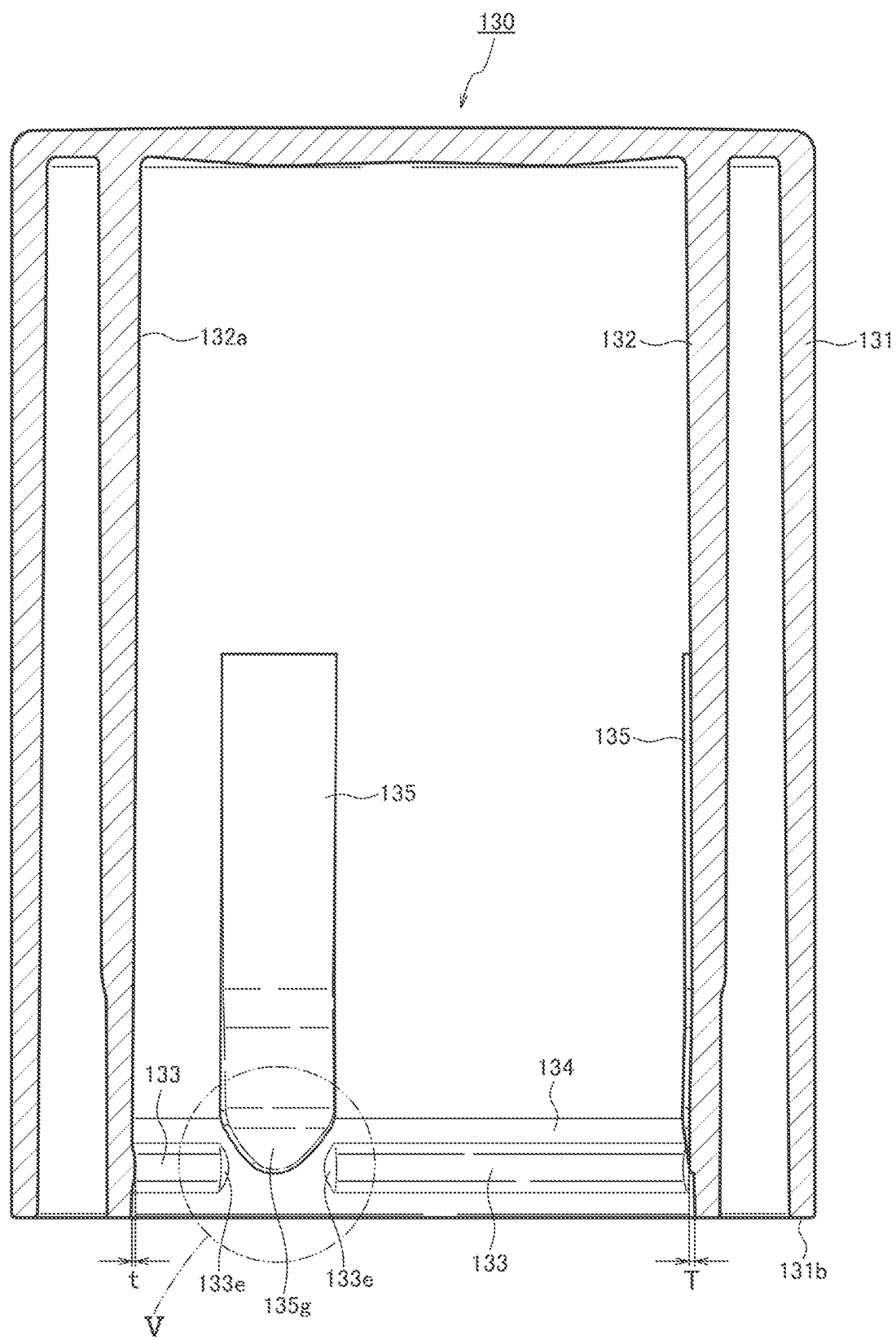
FIG. 4 is a schematic cross-sectional view illustrating a lid member according to the present invention.
Figure 5:
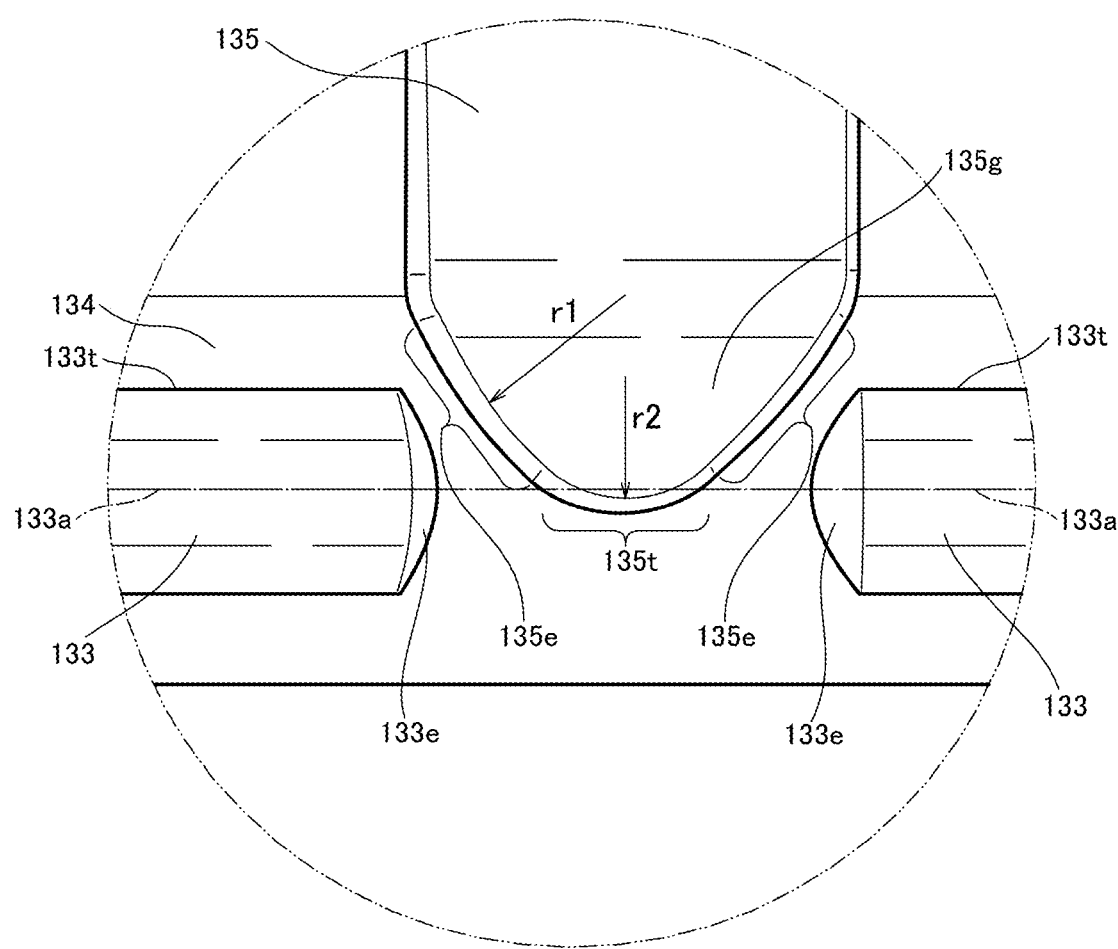
FIG. 5 is an enlarged view illustrating a structurally essential part of the lid member in FIG. 4.
Figure 6:
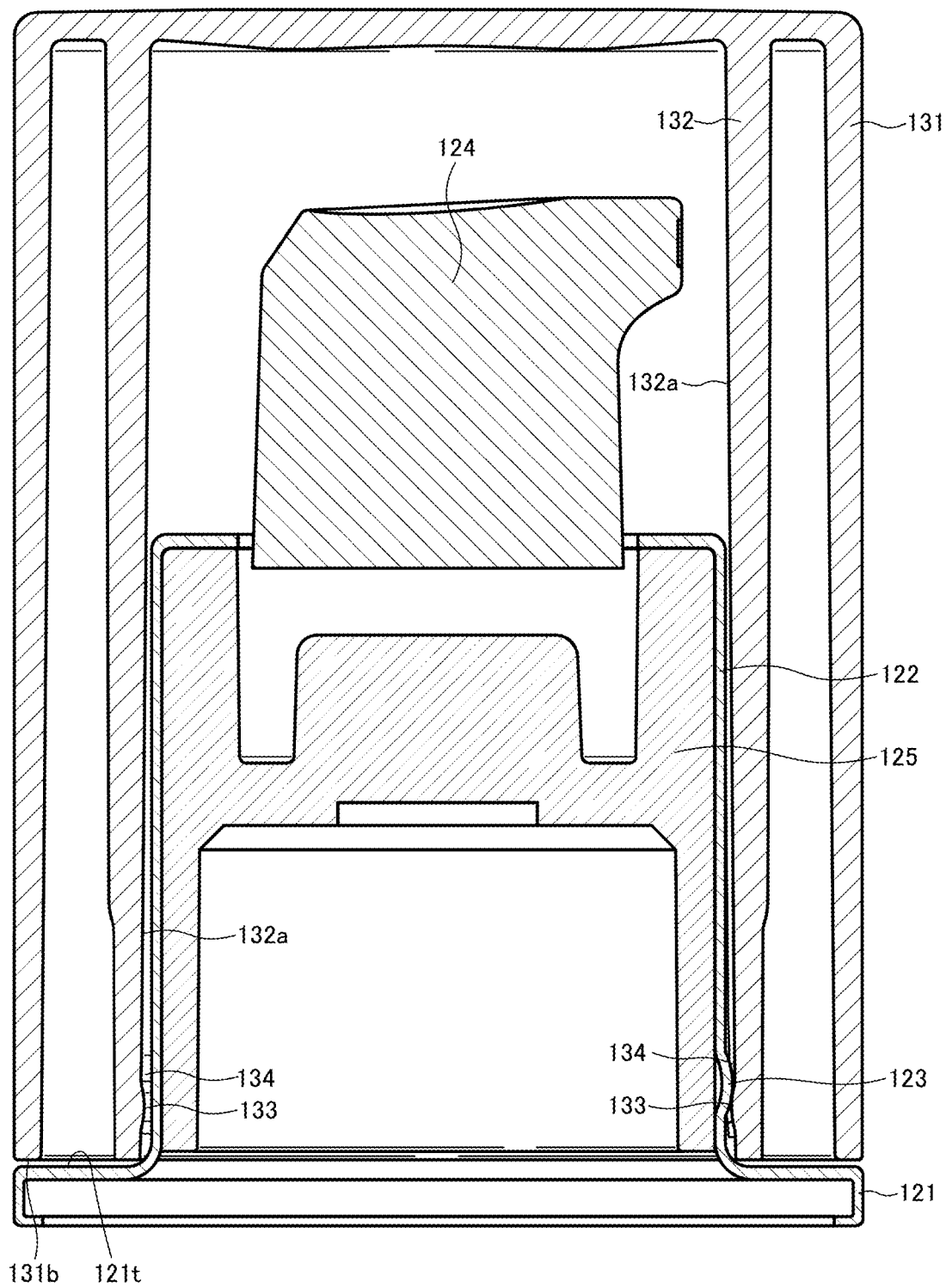
FIG. 6 is a schematic cross-sectional view of a simplified interior structure, illustrating a state in which the lid member according to the present invention is engaged with the pump body.

In this case, FIG. 1 is a schematic view illustrating operation directions to open a lid member of a lotion container with a lid according to the present invention, FIG. 2A is a schematic front view illustrating a closed lid state of the lotion container with a lid according to the present invention, FIG. 2B is a schematic front view illustrating an opened lid state of the lotion container with a lid by means of a rotational operation according to the present invention, FIG. 3 is a schematic view illustrating a pump body according to the present invention, FIG. 4 is a schematic cross-sectional view illustrating a lid member according to the present invention, FIG. 5 is an enlarged view illustrating a structurally essential part of the lid member in FIG. 4, FIG. 6 is a schematic cross-sectional view of a simplified interior structure illustrating a state in which the lid member according to the present invention is engaged with the pump body, and FIG. 7A to FIG. 7D are a schematic explanatory diagram illustrating a process of reaching an opened lid state of the lid member according to the present invention by means of a rotational operation.

The lotion container with a lid 100 according to the present embodiment is provided with a container body 110 configured to contain a lotion, a pump body 120 configured to come to threaded engagement with an upper end opening part of the container body 110 and discharge the lotion in the container body, and a nontransparent lid member 130 configured to detachably fit on this pump body 120.

As illustrated in FIG. 1 to FIG. 2B, the lotion container with a lid 100 allows the lid to be opened by rotating the lid member 130 in an R direction relative to the container body 110.

Further, as illustrated in FIG. 1, the lid of the lotion container with a lid 100 can be opened also by pulling up and closed by pushing down the lid member 130 in a P direction relative to the container body 110.

As illustrated in FIG. 1 to FIG. 2B, the container body 110 is a substantially cylindrical hollow body with a bottom and an upper end opening part which is open upward and can store a liquid cosmetic product in the interior.

In addition, the upper end opening part of the container body 110 is provided with an unillustrated thread structure for threaded engagement for the pump body 120.

Note that a body reference line 110*a* is a virtual line for illustrating a positional relationship relative to the lid member 130.

As illustrated in FIG. 3, etc., the pump body 120 is composed of a flange part 121 having a substantially disk shape, a cylindrical outer side wall surface 122 having a substantially cylindrical shape and continuous with an upper side of the flange part 121, an engaging protrusion 123 having a spherical shape and arranged at a side surface of the cylindrical outer side wall surface 122, a push portion 124 arranged at an uppermost upper surface of the cylindrical outer side wall surface 122, and a pump main body 125 configured to fit inside the cylindrical outer side wall surface 122. The push portion 124 and the pump main body 125 are made of a resin. The flange part 121, the cylindrical outer side wall surface 122, and the engaging protrusion 123 are made of a metal and integrally formed.

The flange part 121 has on an upper surface thereof a flange upper surface part 121*t* and has such a disk shape and size that the container body 110 is substantially flush with a cylindrical shape of the pump body 120 when the pump body 120 is put on the upper end opening part of the container body 110 and threadedly engaged therewith.

The engaging protrusion 123 is provided at a lower part of the cylindrical outer side wall surface 122 in such a manner as to have a spherical shape with an outward protrusion height b with reference to the cylindrical outer side wall surface 122, and is made of a metal.

The push portion 124 is configured to be in communication with a liquid cosmetic product stored in the container body 110 through an unillustrated tube which penetrates the pump main body 125 to extend to a bottom part of the container body 110, and is configured such that a user pushes down using a finger the push portion 124 so as to discharge the liquid cosmetic product.

As illustrated in FIG. 1 to FIG. 2B, FIG. 3 and FIG. 5, etc., the lid member 130 is a substantially cylindrical hollow member having an upper surface part which is closed, and includes an outer side wall 131 having a cylindrical shape and, at a side inner than the outer side wall 131, a cylindrical inner side wall surface 132 having a cylindrical shape and a radius smaller than the outer side wall 131, the cylindrical inner side wall surface 132 sharing a ceiling surface with the outer side wall 131, such that a gap is formed between the outer side wall 131 and the cylindrical inner side wall surface 132.

The outer side wall 131 is provided, at a lowermost part thereof, with an outer side wall bottom surface part 131*b* which has a narrow width and is a circular flat surface.

Further, the lid member 130 is provided, on the cylindrical inner side wall surface 132, with a line of circumferential rib 133 configured to intermittently extend along an inner circumference, a protrusion receiving part 134, and a generatrix direction rib 135, and is made of a resin which is a material that elastically deforms.

The circumferential rib 133 is configured, at a lower part of an inner side wall inner surface part 132a, as a protrusion which has a circumferential rib protrusion height t in an inward direction with reference to the inner side wall inner surface part 132a, has a circular cross section, and extends in a circumferential direction such that a protrusion height in the inward direction is maximum at a circumferential rib ridge line 133a.

The circumferential rib 133 is configured such that at three points which are 120-degree rotationally symmetric with respect to a center of the cylindrical shape of the lid member 130, a portion at which the protrusion is not provided is present such that the circumferential rib 133 terminates at a circumferential rib side end part 133e.

Further, the protrusion receiving part 134 is a region configured to communicate loosely a circumferential rib upper end part 133t and the inner side wall inner surface part 132a with each other and extend in the circumferential direction.

The generatrix direction rib 135 projects, at positions corresponding to the above-mentioned three intermittent gap regions of the circumferential rib 133, inward from the inner side wall inner surface part 132a and extends over more than or equal to a half height of the lid member 130 in a detachment/attachment direction P, i.e., vertically. Further, the generatrix direction rib 135 is provided with a raising part 135g configured to suspend downward than the circumferential rib ridge line 133a and is configured as a protrusion which has a generatrix direction rib protrusion height T in an inward direction with reference to the inner side wall inner surface part 132a at a lower end side part 135t.

As illustrated in FIG. 5, the generatrix direction rib 135 is configured to have a downward convex shape at the raising part 135g such that this downward convex shape is made by a pair of guide side parts 135e comprising a first radius of curvature r1 and having a substantially inverted V-shape and the lower end side part 135t comprising a second radius of curvature r2 smaller than the first radius of curvature and connecting this pair of guide side parts 135e.

The generatrix direction rib 135 extends from a position higher than the circumferential rib upper end part 133t to a position lower than the circumferential rib upper end part 133t so that the lower end side part 135t is positioned lower than the circumferential rib upper end part 133t.

In addition, the lower end side part 135t is positioned lower than the circumferential rib ridge line 133a.

As illustrated in FIG. 5, the lower end side part 135t is positioned between the two circumferential rib side end parts 133e facing each other and is arranged to be separated by a certain distance from the circumferential rib side end parts 133e, and a gap between the lower end side part 135t and the circumferential rib side end part 133e is continuous with the protrusion receiving part 134.

Note that a lid member reference line 130a is a virtual line for illustrating a positional relationship relative to the container body 110, and a closed lid state is realized through an arrangement in which the lid member reference line 130a is not continuous with an extended line of the body reference line 110a as illustrated in FIG. 1 and FIG. 2A, whereas an opened lid state is realized by releasing engagement between the pump body 120 and the lid member 130 when the lid member 130 is rotated in the R direction indicated by an arrow in FIG. 2A such that the lid member reference line 130a is continuous with the extended line of the body reference line 110a as illustrated in FIG. 2B, and thus the lid member 130 can be removed by merely lightly lifting the lid member 130 in the P direction indicated by an arrow.

In a closed lid state, as illustrated in FIG. 6, the pump body 120 and the lid member 130 are engaged with each other. Then, the inner side wall inner surface part 132a of the lid member 130 faces immediately outside the cylindrical outer side wall surface 122 of the pump body 120, the outer side wall bottom surface part 131b of the lid member 130 faces immediately upside the flange upper surface part 121t of the pump body 120, and the engaging protrusions 123 arranged at corresponding three points of the pump body 120 engage and is in sliding contact in a point contact manner with the corresponding circumferential ribs 133 of the lid member 130. Further, the engaging protrusions 123 of the pump body 120 face the protrusion receiving part 134 of the lid member 130.

Then, the size is configured such that the engaging protrusion protrusion height b is greater than the circumferential rib protrusion height t, which creates a gap between the cylindrical outer side wall surface 122 and the inner side wall inner surface part 132a so that friction due to surface contact between the cylindrical surfaces does not occur, and thus an operation of rotating the lid member 130 can be carried out using a small force.

Next, a process of rotating the lid member 130 in a closed lid state into an opened lid state will be explained with reference to FIG. 7A to FIG. 7D. Note that for the sake of explanation, FIG. 7A to FIG. 7D are created with a point of view fixed at the lid member 130.

Figure 7A:
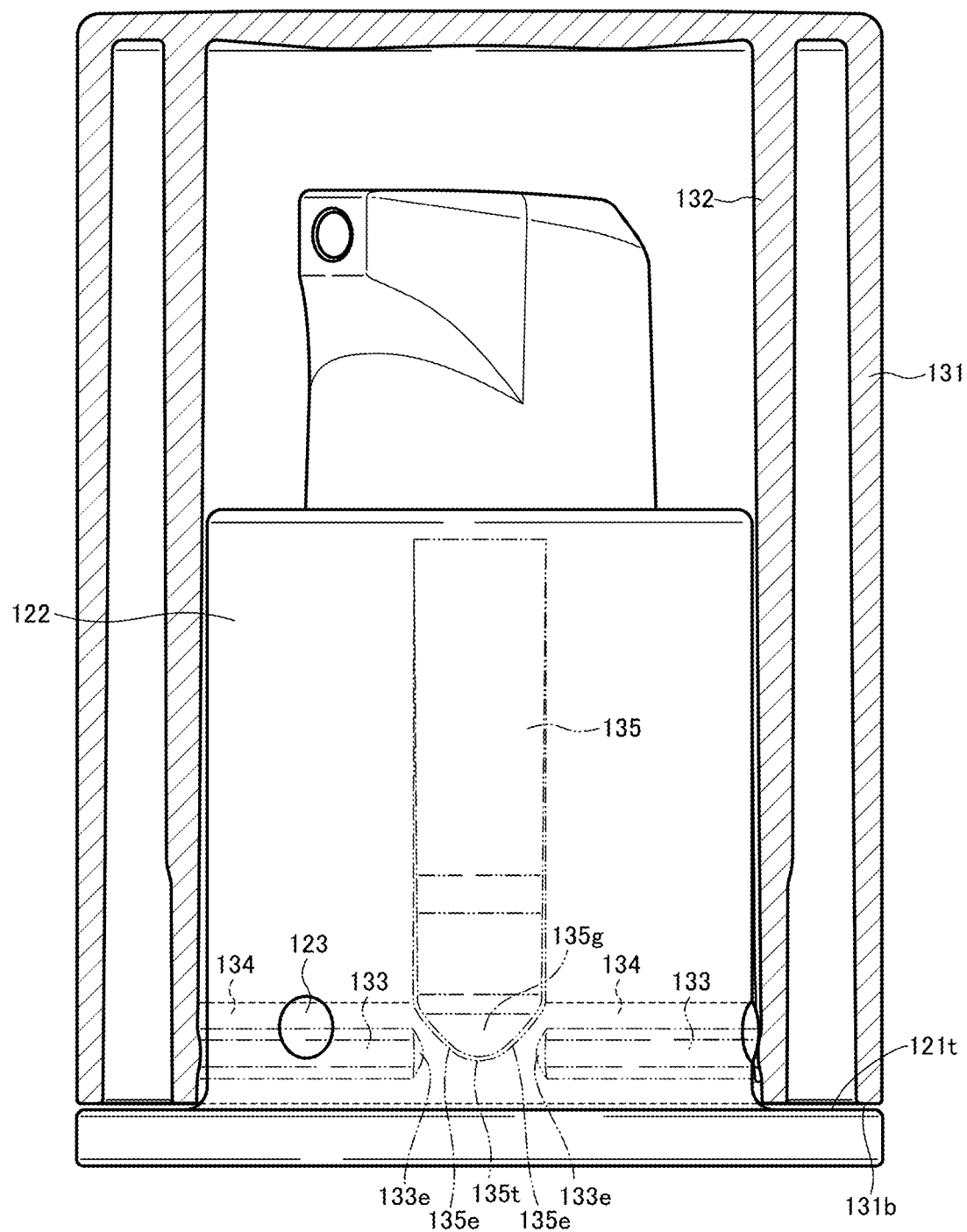
FIG. 7A is a schematic explanatory diagram illustrating a process of realizing an opened lid state of the lid member according to the present invention by means of a rotational operation.

FIG. 7A schematically illustrates a closed lid state, and in a closed lid state, the spherical engaging protrusion 123 arranged at the cylindrical outer side wall surface 122 of the pump body 120 engage the circumferential rib 133 at a circumferential optional position of the circumferential rib 133 arranged in the cylindrical inner side wall surface 132 of the lid member 130 and is in sliding contact in a point contact manner with the circumferential rib 133.

Figure 7B:
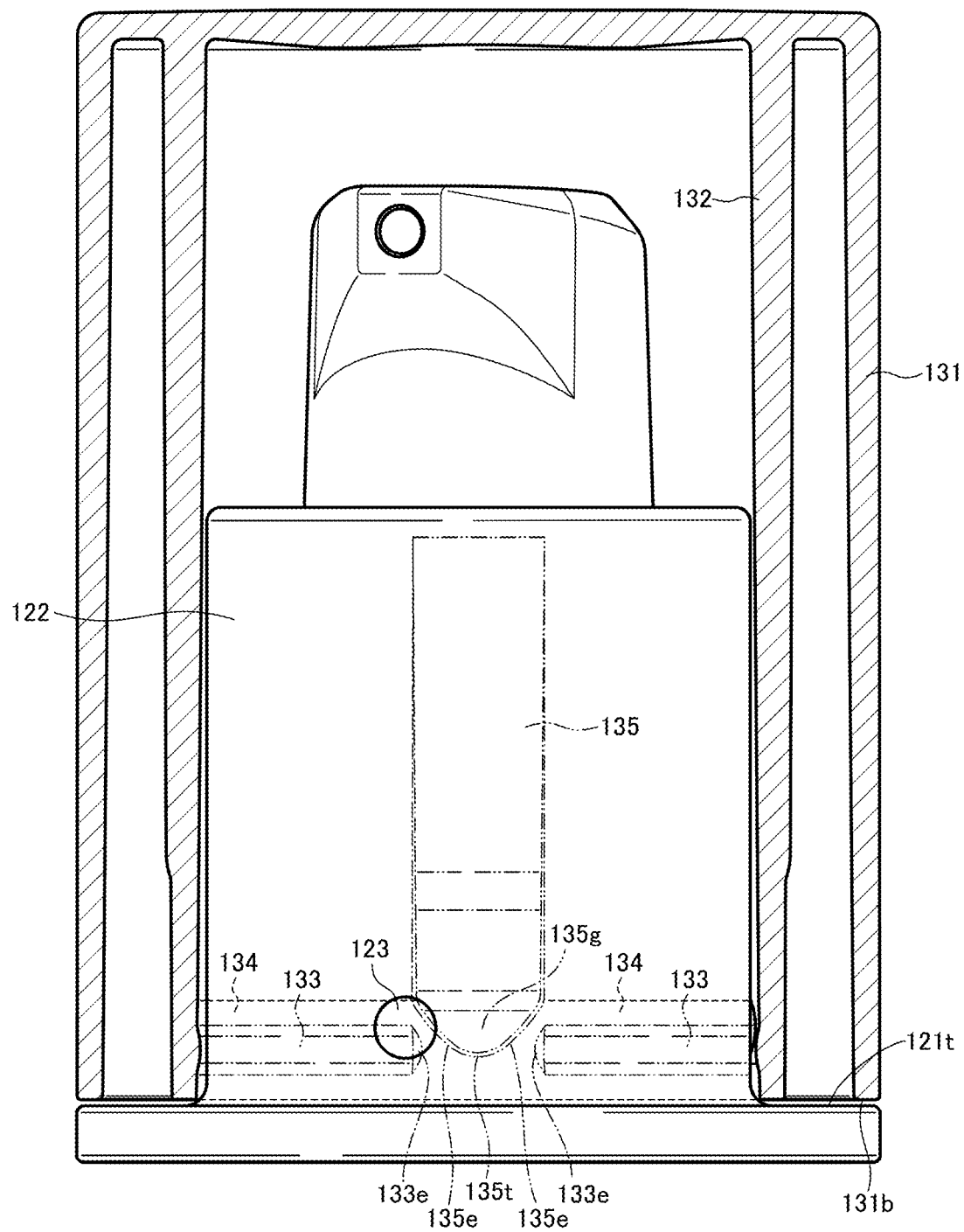
FIG. 7B is a schematic explanatory diagram illustrating a process of realizing an opened lid state of the lid member according to the present invention by means of a rotational operation.

In this state, when a user of the lotion container with a lid holds and rotates the outer side wall 131 of the lid member 130, as illustrated in FIG. 7B, the engaging protrusion 123 slides still in a point contact manner relative to the circumferential rib 133 in accordance with the rotation of the lid member 130 such that the guide side part 135e configured to form the downward convex shape of the raising part 135g of the generatrix direction rib 135 reaches such a position as to abut against the engaging protrusion 123.

If the lid member 130 is to be further rotated from this position, the inward protrusion of the generatrix direction rib 135 having the generatrix direction rib protrusion height T prevents the engaging protrusion 123 from riding over the raising part 135g, while the entirety of the lid member 130 receives a force in such a direction as to rise up along the inclination of the guide side part 135e.

Figure 7C:
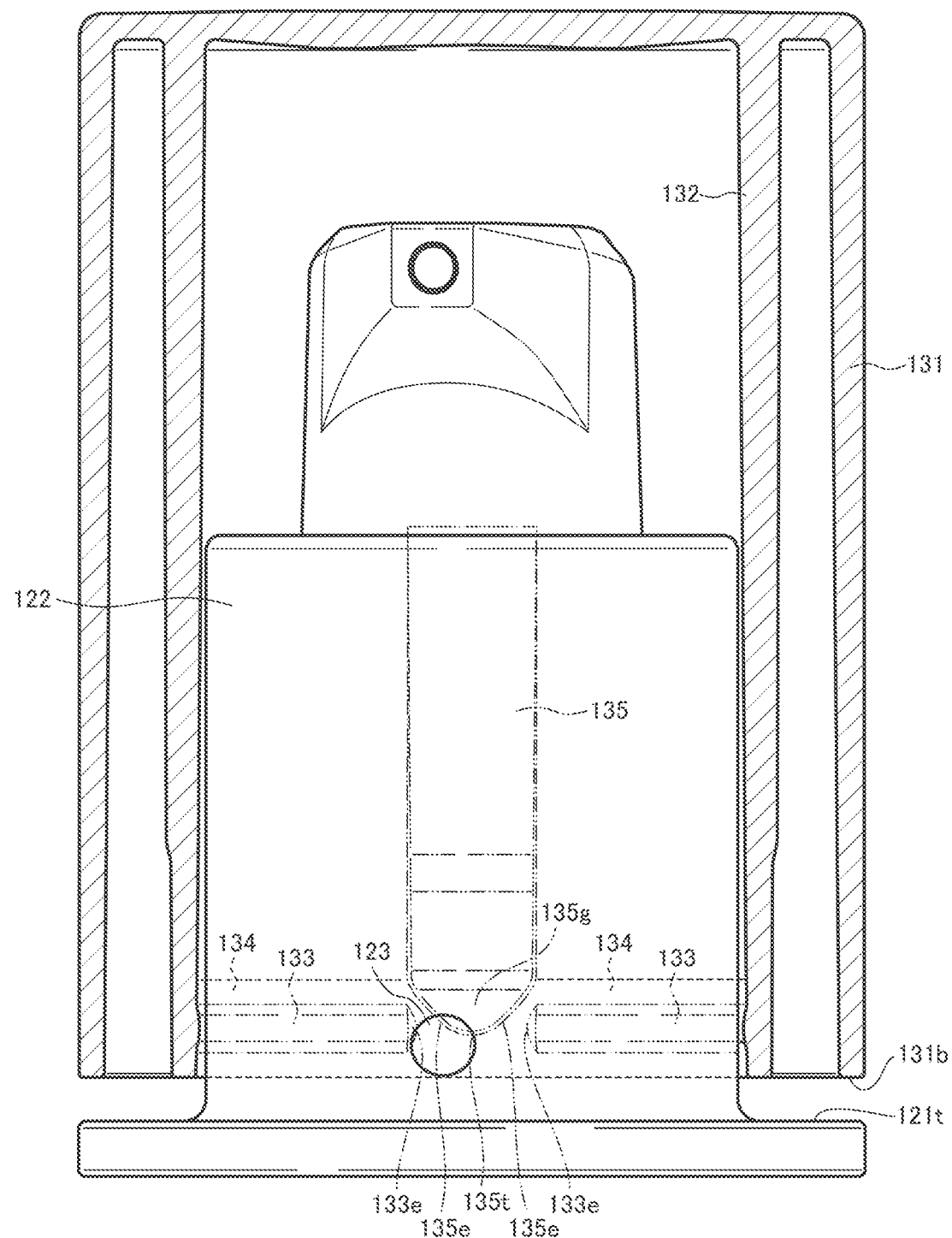
FIG. 7C is a schematic explanatory diagram illustrating a process of realizing an opened lid state of the lid member according to the present invention by means of a rotational operation.

Then, the engaging protrusion 123 reaches in the vicinity of the circumferential rib side end part 133e so that when the entirety of the lid member 130 rises up along the inclination of the guide side part 135e, as illustrated in FIG. 7C, engagement between the engaging protrusion 123 and the circumferential rib 133 is released and the entirety of the lid member 130 rises up to such a position that the lower end side part 135t of the raising part 135g abuts the engaging protrusion 123.

Then, the size is configured such that the generatrix direction rib protrusion height T is greater than the circumferential rib protrusion height t, which allows a force of an operation of rotating the lid member 130 by a user to be reliably changed into a force in such a direction as to raise the lid member 130 due to abutment and sliding of the guide side part 135e relative to the engaging protrusion 123.

If this situation is described on the basis of the lid member 130, the engaging protrusion 123 in sliding contact in a point contact manner with the circumferential rib 133 abuts the guide side part 135e and is then guided along the inclination of the guide side part 135e to move in a part corresponding to a gap between the guide side part 135e and the circumferential rib side end part 133e so as to be released from engagement with the circumferential rib 133.

Figure 7D:
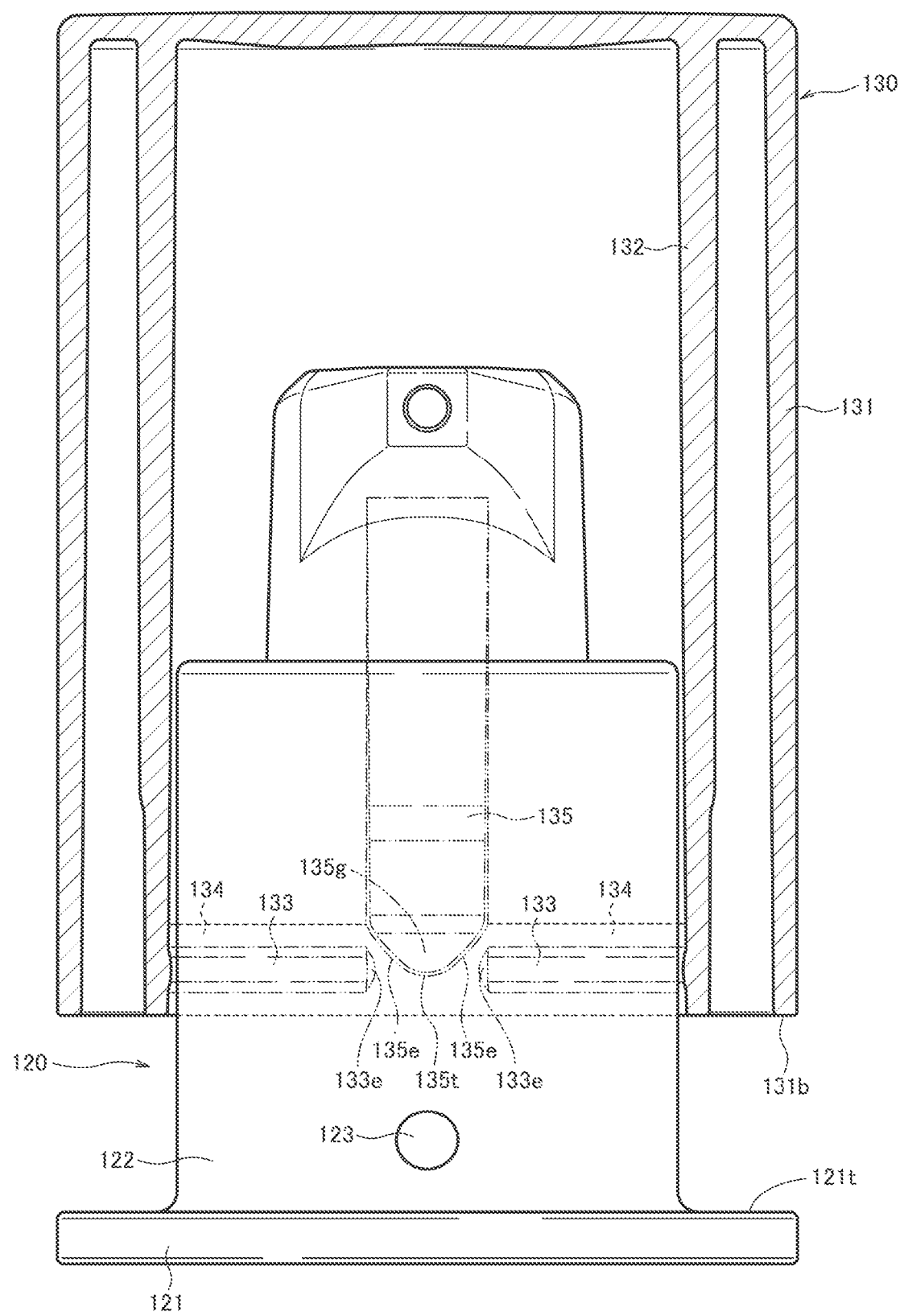
FIG. 7D is a schematic explanatory diagram illustrating a process of realizing an opened lid state of the lid member according to the present invention by means of a rotational operation.

When the lid member 130 rises up to such a position that the lower end side part 135t abuts the engaging protrusion 123, there is realized an opened lid state in which engagement between the circumferential rib 133 and the engaging protrusion 123 is released, and consequently, as illustrated in FIG. 7D, the lid member 130 can be fully removed by lifting the lid member 130 upward.

Conversely, to realize a closed lid state from an opened lid state, the lid member 130 is put to cover the pump body 120 and is merely lightly pushed from upward, whereby the engaging protrusion 123 rides over the circumferential rib 133 to engage the same.

Then, depending upon an angle of the lid member 130, there occurs a case in which the generatrix direction rib 135 is pushed from directly above the engaging protrusion 123 of the pump body 120, as illustrated in FIG. 7D, and in this case, the lower end side part 135t of the raising part 135g abuts the engaging protrusion 123 and then the lid member 130 is guided to rotate and escape horizontally along the guide side part 135e, so that a closed lid state is realized through a process precisely in reverse of an operation of opening a lid.

As described above, according to the lotion container with a lid 100 according to the present embodiment, the pump body 120 is provided with the cylindrical outer side wall surface 122 having the engaging protrusion 123 configured to engage the lid member 130, and the lid member 130 is provided, at the cylindrical inner side wall surface 132, with a line of circumferential rib 133 along the inner circumference of this lid member 130 so that, to close the pump body 120 by the lid member 130, the cylindrical inner side wall surface 132 of the lid member 130 fits on the cylindrical outer side wall surface 122 of the pump body 120, whereby the engaging protrusion 123 of the pump body 120 comes to engagement at at least any of abutting points of the circumferential rib 133 along the inner circumference of the lid member 130 and is thus prevented from detaching, while, to lift the lid member 130 relative to the container body 110 to release the pump body 120 from the lid member 130, the circumferential rib 133 of the lid member 130 rides over the spherical engaging protrusion 123 toward a lifting direction of the lid member 130 so as to release engagement between the circumferential rib 133 of the lid member 130 and the engaging protrusion 123 of the pump body 120, and thus, the lid member 130 can reliably fit on the pump body 120 and be held thereon when the lid is closed, and furthermore, the lid member 130 can be easily opened from the pump body 120 by merely being lifted without being rotated relative to the container body 110 during a lid opening operation.

Moreover, the pump body is provided with the spherical engaging protrusion 123 configured to engage the lid member 130, and the lid member 130 is provided with a line of circumferential rib 133 configured to intermittently extend along the inner circumference of this lid member 130 and to be engaged with the engaging protrusion 123 of the pump body 120 and the generatrix direction rib 135 at an intermittent gap region of this line of circumferential rib 133, the generatrix direction rib being configured to be engaged with the engaging protrusion 123 of the pump body 120 so that, to open the pump body 120 and the lid member 130 by rotating the lid member 130 relative to the container body 110, the lid member 130 is guided in a direction to rise up from the pump body 120 while the raising part 135g of the lid member 130 abuts the engaging protrusion 123 of the pump body 120 so as to release engagement between the circumferential rib 133 of the lid member 130 and the engaging protrusion 123 of the pump body 120 at the intermittent gap region of the circumferential rib 133, which allows the lid to be easily opened while the pump body 120 does not rotate together with the lid member 130 even when the lid member 130 is rotated relative to the container body 110 during a lid opening operation, and leakage of a lotion in the container body 110 when opening the lid can be prevented.

Further, the generatrix direction rib 135 of the lid member 130 is configured to suspend downward than the circumferential rib ridge line 133a of the lid member 130 so that, when the lid member 130 is guided in a direction to rise up relative to the pump body 120, the circumferential rib 133 of the lid member 130 is guided upward than the engaging protrusion 123 of the pump body 120, which can prevent from returning to a closed lid state caused by overrotation of the lid member 130 and the resulting engagement again between the circumferential rib 133 of the lid member 130 and the engaging protrusion 123 of the pump body 120 even when the lid member 130 is rotated with a great force.

In addition, the generatrix direction rib 135 of the lid member 130 is provided with the raising part 135g configured to suspend downward than the circumferential rib ridge line 133a of the lid member 130 at an intermittent gap region of a line of circumferential rib 133 so that, to fit the lid member 130 on the pump body 120 to come to a closed lid state, even when the generatrix direction rib 135 of the lid member 130 is pushed from directly above the engaging protrusion 123 of the pump body 120, then the lid member 130 is guided in such a manner as to rotate and escape horizontally along the raising part 135g of the generatrix direction rib 135 which abuts the engaging protrusion 123 of the pump body 120, which allows a closed lid state to be easily realized independent of an orientation of the lid member 130 by merely fitting the lid member 130 on the pump body and pushing the same downward.

Furthermore, the engaging protrusion 123 of the pump body 120 is formed to have a spherical shape, which allows for engagement with the generatrix direction rib 135 of the lid member 130 in a point contact manner and accordingly less friction, whereby opening and closing by means of a detachment/attachment operation of the lid member 130 can be carried out using a small force, and further, an operation of rotating the lid member 130 to realize an opened lid state can be carried out using a small force.

Moreover, the pump body 120 is provided, at the cylindrical outer side wall surface 122, with the spherical engaging protrusion 123 configured to engage the circumferential rib 133 of the lid member 130 when the lid is closed so that the cylindrical outer side wall surface 122 has a simple and smooth shape consisting only of a cylindrical shape and a spherical protruding shape, which allows a lotion adhering to the pump body 120 to be easily wiped off.

The raising part 135g of the generatrix direction rib 135 includes the pair of guide side parts 135e comprising the first radius of curvature r1 and having the substantially inverted V-shape and the lower end side part 135t comprising the second radius of curvature r2 smaller than the first radius of curvature r1 and connecting this pair of guide side parts 135e so that in comparison to a case in which the raising part 135g is configured to have a simple semi-circular shape, the radius of curvature of the guide side part 135e is larger and a difference in elevation of the raising part 135g is greater due to a shaper inclination, while when in a closed lid state the lid member is rotated such that the generatrix direction rib 135 of the lid member abuts the engaging protrusion 123 of the pump body 120, and is further rotated, the lid member 130 is reliably guided in a direction to rise up along the raising part 135g of the generatrix direction rib 135, and thus in a closed lid state, by merely rotating the lid member 130, the lid can be reliably opened without applying a force to lift the lid member 130 and further, returning to a closed lid state again caused by overrotation can be reliably prevented, and furthermore, in comparison to a case in which the pair of guide side parts 135e and the lower end side part 135t are formed to have the same radius of curvature in such a manner as to have a semi-circular shape, the radius of curvature of the lower end side part 135t is smaller, and to fit the lid member 130 on the pump body 120 to come to a closed lid state, even when the generatrix direction rib 135 of the lid member 130 is pushed from directly above the engaging protrusion 123 of the pump body 120, then the lid member 130 is naturally guided in such a manner as to rotate horizontally and escape along the downward convex shape of the generatrix direction rib 135, which allows a closed lid state to be naturally realized independent of an orientation of the lid member 130 by merely fitting the lid member 130 on the pump body 120 and pushing the same downward.

The lid member 130 is made of a material which elastically deforms so that a shape of the lid member 130 in a closed lid state deforms when the lid member 130 is guided in a direction to rise up along the downward convex shape of the generatrix direction rib 135, and restores an original shape in an opened lid state, whereby an operation of opening and closing the lid member 130 can be smoothly carried out, and further, no wear or deformation of the circumferential rib 133 of the lid member 130 occurs even when repeated operations of opening and closing the lid member 130 are carried out and the lid member 130 in a closed lid state can be prevented from loosening.

The generatrix direction rib protrusion height T oriented inward from the lid member 130 is configured to be greater than the circumferential rib protrusion height t oriented inward from the lid member so that when in a closed lid state the lid member 130 is rotated such that the generatrix direction rib 135 of the lid member 130 abuts the engaging protrusion 123 of the pump body 120, and is further rotated so as to guide the lid member 130 in a direction to rise up along the downward convex shape of the generatrix direction rib 135, abutment of the generatrix direction rib 135 relative to the engaging protrusion 123 is maintained even when the lid member 130 is elastically deformed, and accordingly, also when the lid member 130 is elastically deformed, the lid member 130 can be further reliably guided in a direction to rise up with the raising part 135e of the generatrix direction rib 135 along the engaging protrusion 123 of the pump body 120, and furthermore, to fit the lid member 130 on the pump body 120 to come to a closed lid state, even when the generatrix direction rib 135 of the lid member 130 is pushed from directly above the engaging protrusion 123 of the pump body 120 and the lid member 130 is elastically deformed, then abutment of the generatrix direction rib 135 relative to the engaging protrusion 123 is maintained and the lid member 130 is reliably guided in such a manner as to escape horizontally along the raising part 135g of the generatrix direction rib 135, which allows a closed lid state to be further reliably realized independent of an orientation of the lid member 130 by merely fitting the lid member 130 on the pump body and pushing the same downward.

The generatrix direction rib 135 of the lid member 130 extends over more than or equal to a half height of the lid member 130 in a detachment/attachment direction so that a force applied from the engaging protrusion 123 of the pump body 120 is dispersed over a height direction of the generatrix direction rib 135 and thus partial deformation of the lid member 130 is restrained, whereby the lid member 130 exhibits an excellent shape maintaining property and consequently, the lid member 130 in a closed lid state can be prevented from loosening.

Note that although the present invention pertains to a lotion container with a lid according to the present invention including: a container body configured to contain a lotion; a pump body configured to come to threaded engagement with an upper end opening part of this container body and discharge the lotion in the container body; and a nontransparent lid member configured to detachably fit on the pump body, it is needless to say that the present invention can be applied to a lotion container with a lid comprising: a container body configured to contain a lotion; an inner lid configured to come to threaded engagement with an upper end opening part of this container body and seal the lotion in the container body; and a nontransparent lid member configured to detachably fit on this inner lid, without using the pump body.

REFERENCE SIGNS LIST 100 lotion container with lid
110 container body
110a body reference line
120 pump body
121 flange part
121t flange upper surface part
122 cylindrical outer side wall surface
123 engaging protrusion
124 push portion
125 pump main body
130 lid member
130a lid member reference line
131 outer side wall
131b outer side wall bottom surface part
132 cylindrical inner side wall surface
132a inner side wall inner surface part
133 circumferential rib
133a circumferential rib ridge line
133e circumferential rib side end part
133t circumferential rib upper end part
134 protrusion receiving part
135 generatrix direction rib
135g raising part
135e guide side part
135t lower end side part
b engaging protrusion protrusion height
T generatrix direction rib protrusion height
t circumferential rib protrusion height
r1 radius of curvature of guide part (first radius of curvature)
r2 radius of curvature of lower end part (second radius of curvature)
P detachment/attachment operation direction
R rotational operation direction

The invention claimed is:

1. A lotion container with a lid, comprising: a container body configured to contain a lotion; a pump body configured to come to threaded engagement with an upper end opening part of the container body and discharge the lotion in the container body; and a nontransparent lid member configured to detachably fit on the pump body, wherein:
the pump body is provided with a cylindrical outer side wall surface having a spherical engaging protrusion configured to engage the lid member, and
the lid member is provided, at a cylindrical inner side wall surface, with a line of circumferential rib configured to intermittently extend along an inner circumference of the lid member and to be engaged with the engaging protrusion of the pump body and a generatrix direction rib provided with a raising part configured to suspend downward than a ridge line of the circumferential rib at an intermittent gap region of the line of circumferential rib, the generatrix direction rib being configured to be engaged with the engaging protrusion of the pump body.

2. The lotion container with a lid according to claim 1, wherein the raising part of the generatrix direction rib includes a pair of guide side parts comprising a first radius of curvature and having a substantially inverted V-shape and a lower end side part comprising a second radius of curvature smaller than the first radius of curvature and connecting the pair of guide side parts.

3. The lotion container with a lid according to claim 1, wherein the lid member is made of a material which elastically deforms.

4. The lotion container with a lid according to claim 3, wherein a generatrix direction rib protrusion height oriented inward from the lid member is configured to be greater than a circumferential rib protrusion height oriented inward from the lid member.

5. The lotion container with a lid according to claim 3, wherein the generatrix direction rib of the lid member extends over more than or equal to a half height of the lid member in a detachment/attachment direction.

* * * * *